United States Patent Office 3,458,615
Patented July 29, 1969

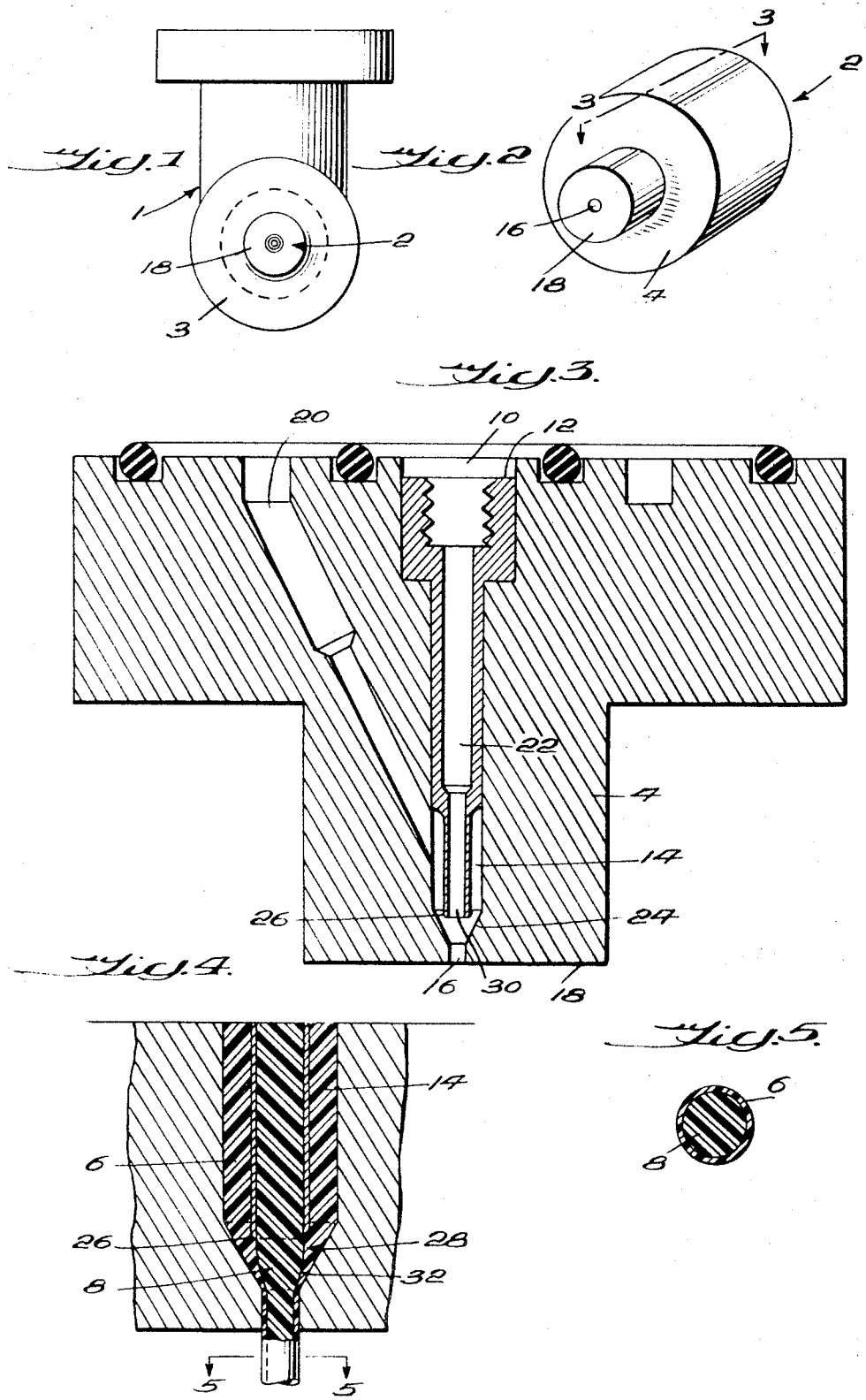

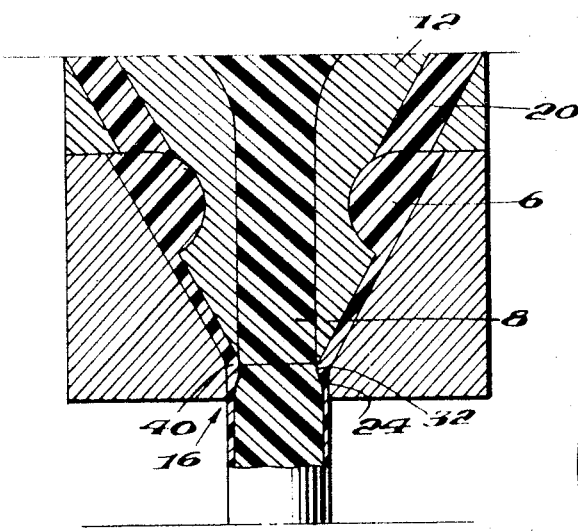
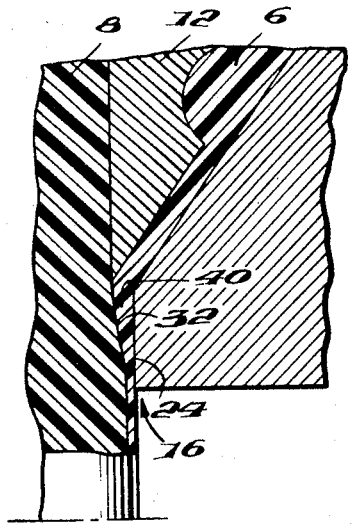
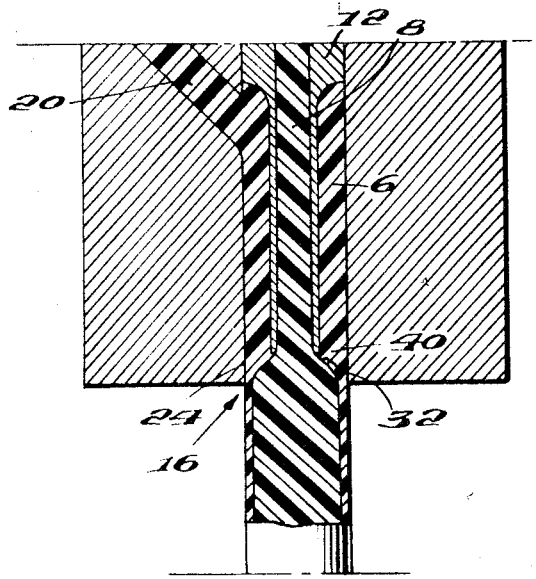

3,458,615
HYDRODYNAMICALLY CENTERING SHEATH/ CORE FILAMENT SPINNERETTE
Chester Griswold Bragaw, Jr., West Chester, Pa., and Robert Latham Washburn, Vienna, W. Va., assignors to E. I. du Pont de Nemours and Company, Wilmington, Del., a corporation of Delaware
Filed Apr. 18, 1967, Ser. No. 631,718
Int. Cl. B29f 3/10
U.S. Cl. 264—171                    10 Claims

ABSTRACT OF THE DISCLOSURE

A sheath/core filament with the core well centered in the sheathing material is produced by a spinnerette designed to create a circumferential pressure-equalizing annular wedge within the sheath polymer stream to center the core polymer stream as the sheath and core polymer streams are being extruded simultaneously through the same orifice to produce a sheath/core filament.

BACKGROUND OF THE INVENTION

This invention relates to the production of approximately concentric sheath/core polymeric filaments from at least two molten polymer streams. The process is applicable to the production of any sheath/core filament but is particularly useful in the production of sheath core fiber optical filaments of small diameter where concentricity of the sheath and core is most important due to the small diameter of the filament and the need to maximize the light transmission at any given fiber diameter.

Prior to this invention, concentricity of the sheath and core was obtained by adjustment of metering surfaces to regulate (meter) the polymer flow. The metering surfaces are produced by closely machining two surfaces so as to produce a narrow opening which will effectively meter polymer at a uniform pressure and rate as it is being extruded about the core filament. One example of a type of spinnerette used prior to this invention is the plateau-type spinnerette as patented by Kilian, United States Patent No. 2,936,482. In the plateau spinnerette, circumferential distribution of sheath polymer around the core is achieved by metering the sheath polymer in the restrictive circumferential annular space. The distribution of sheath polymer is sensitively affected by the height of the circumferential annular space (flow varies as the cube of height). For example, in producing 10 mil filaments with a 1/10 mil sheath, the height of the circumferential annular space (the gap between the adjustable parts) is adjusted to be in the .0005 inch to .001 inch range by use of shims between spinnerette parts. It can be seen that if precise manufacture of the parts of the spinnerette is not maintained, the height of the circumferential annular space will vary, and as it varies in height, the cube of that height produces extremely different back pressures in various parts of the annular space. It will then be seen that as this back pressure varies, it produces a different or a differing thickness of polymer sheath due to the greater pressure on one side of the core than there is at another point on the core. If the difference in height of the restrictive circumferential annular space is sufficient and the sheath to be applied is sufficiently thin, the pressure on one side of the core can push the core so far to the other side so as to produce no coating of one side of the core.

It will be seen that as the number of spinnerette holes is increased, the problem becomes greatly amplified, due to the fact that the controlling shims now control or vary the height of many restrictive circumferential annular spaces. Thus, it would take only a slight difference in machining of the parts of the spinnerette from one side to the other to produce an extreme relative difference in the height of the circumferential annular space. The same problem is also found to adversely affect injector-type spinnerettes of the type hereinafter described that use only a close metering surface to effect the sheathing of the core.

SUMMARY OF THE INVENTION

Surprisingly, it has been discovered that the precise circumferential metering of the polymer sheath to be extruded about the polymeric core can be eliminated in favor of using the ability of a fluid under pressure to circumferentially equalize pressure within itself and thus center an axially contained fluid stream by creating an annular wedge-shaped flow of sheath polymer around the axially contained fluid stream. Thus, the problem of closely mechanically metering the sheath polymer to be extruded about the core is eliminated by the use of the pressure generated within the wedge to center the core polymer in the sheath polymer stream and yet still produce a sheath core filament with the core extremely well-centered within the sheath.

This and other embodiments of this invention will be hereinafter described with reference to the following numbered drawings:

FIG. 1 shows an end view of an extruder head with spinnerette in place;

FIG. 2 shows a perspective view of the spinnerette;

FIG. 3 shows an enlarged partial view of the spinnerette assembly taken along line 3—3;

FIG. 4 shows an enlarged partial view of the spinnerette of FIG. 3 as it is producing a continuous sheath/core filament with the filament partially sectioned;

FIG. 5 shows an enlarged cross-section of the sheath/ core filament produced by this invention taken along line 5—5;

FIG. 6 shows an alternate construction of the spinnerette of FIG. 4 producing a continuous sheath/core filament with the filament partially sectioned;

FIG. 7 shows an enlarged partial view of the spinnerette of FIG. 6 showing the reverse wedge more clearly;

FIG. 8 shows an alternate construction of the spinnerette of FIG. 4 producing a continuous sheath/core filament with the filament partially sectioned.

Referring to the drawings, FIG. 1 shows a conventional cross-head 1 with a one-hole spinnerette 2, with only the die face 18 showing, held by any conventional means in the cross-head by locking plate 3.

FIG. 2 shows the spinnerette 2 comprised of a metallic block 4 having an extrusion orifice 16 terminating in the die face 18. Within the spinnerette, as shown in FIG. 3, the cavity 10 contains an injector 12 which communicates with the core polymer supply. One end of the injector 12 is threaded to facilitate removal for cleaning. The other end of the injector 12 communicates with sheath polymer reservoir 14 which terminates in an orifice 16 in the face 18 of the metallic block 4. The sheath polymer reservoir 14 communicates with the sheath polymer supply through channel 20. Both sheath and core polymers are supplied in melt form to the spinnerette under pressure by extruders.

The injector 12 is necked down near the channel 20 to segregate the lower end of cavity 10 to form the sheath polymer reservoir 14. The injector 12 then terminates within the sheath polymer cavity 14 near the spinnerette face 18. Injector 12 has an internal core polymer passage 22 through which the core polymer is extruded. The injector 12 should be centered within the sheath polymer reservoir 14 so that passage 22 will be less than 2 mils off-center, and preferably perfectly centered. Mechanical centering of passage 22 will not of itself produce the well-centered product of this invention but it is a factor that can effect the end product by eliminating a potential source of mis-centering of the core stream. The relative sizes of the sheath polymer reservoir 14, the passage 22, and the distance of the injector tip from the fixed annular surface 24 near which the injector terminates, can all be varied by varying the shape, length or size of the tapered portion of the insert 12 or the angle of the fixed annular surface 24. The sheath polymer reservoir 14 is of sufficient width (side clearance around the injector) to provide an unrestricted supply of sheath polymer to all sides of the injector tip 26.

The injector tip 26 is recessed far enough from the fixed annular surface 24 so that the annular space between the injector tip 26 and the fixed annular surface 24 is less restrictive of the sheath polymer stream than the annular space between the core polymer stream and the block 4 at the orifice 16. Thus, even with differences in dimensions due to machining tolerances, the pressure of the polymeric sheath material is substantially equal on all sides of the polymeric core material at the outlet 30 of the core polymer passage 22 due to the ability of a slowly flowing (or static) fluid under pressure to circumferentially equalize pressure within itself.

Upon operation of the extruder, molten polymeric core material 8 is extruded down the passage 22 of the injector 12, while molten polymeric sheath material 6 is being extruded through channel 20. The sheath polymer reservoir 14 fills with sheath polymer material 6, and the sheath polymer material 6 comes into intimate contact with the core polymer material 8 at the outlet 30 of the injector 12. The diameter of the stream of core polymer material may or may not swell radially depending on the sheath polymer material extrusion pressure and draw-off rate and viscoelasticity of the core polymer material.

Below the tip 26 of the injector, a wedge-shaped annular circumferential pressure-equalizing region 28 is formed within the sheath polymer stream 6. This wedge-shaped region 28 is defined by a fixed annular surface 24 of the reservoir and a moving annular surface 32 that is formed by the interface of the sheath and core polymer streams. The fixed annular surface 24 and the moving annular surface 32 are convergent with respect to each other in the direction of the orifice 16. It is preferred that the wedge-shaped region be monotonically decreasingly convergent (i.e., the rate of convergence with distance never drops to zero) toward the orifice 16. The rate at which the wedge-shaped surfaces converge need not be uniform but the angle between the fixed and moving surface should be in the range of 5° to 75° and preferably in the range of 25° to 60°.

As the fixed surface 24 and the moving surface 32 approach orifice 16 the wedge-shaped region 28 can be produced in several different ways: the fixed surface 24 can be convergent toward the orifice while moving surface 32 is neither convergent nor divergent with respect to the orifice 16; the moving surface 32 can be divergent toward the orifice 16 while the fixed surface 24 is neither convergent nor divergent toward the orifice 16; the fixed surface 24 can be convergent toward the orifice while the moving surface 32 is divergent toward the orifice 16; and both surfaces 24 and 32 can be convergent toward the orifice. The conformation of the core polymer stream is determined by the relative extrusion pressures on the sheath and core polymer streams, the draw off rates and the viscoelasticity of the core polymeric material.

Consistent with the above description of how the wedge-shaped region 28 can be formed FIGS. 6, 7 and 8 show enlarged partial views of alternate constructions of a spinnerette such as the one shown in FIG. 4. with injector tip 26 and/or surface 24 being changed so as to produce a reverse wedge-shaped region 40. FIGS. 6 and 7 show an embodiment in which the sheath polymer passage 20 is highly restricted near the tip of injector 12. Precise centering of the injector 12 is in itself insufficient to produce an excellent product. The creation of the reverse wedge within the orifice 16 is required to produce excellent product.

The pressures generated within the wedge-shaped region 28 are a result of several factors. The major factors are the extrusion pressures, the size of orifice 16 and the viscosity of the sheath and core polymers. Another factor in generating pressure is the phenomenon of "drag flow" that occurs at the interface 32 of the sheath core polymer streams. The movement of the core polymer stream relative to the sheath polymer stream results in a dragging or pumping of sheath polymeric material into the wedge-shaped region 28, increasing the pressure within the wedge-shaped region 28 as the wedge narrows. Thus a pressure gradient is set up within the wedge-shaped region 28. The rate at which sheath polymeric material is pumped into the wedge-shaped region 28 is uniform over the entire moving surface 32 and the pressure of the sheath polymeric material upstream from the wedge is uniform, thus the pressure developed at any point within the wedge-shaped region 28 is determined by the width of the wedge-shaped region 28 at that point. A complete exposition of the principle can be found in "Engineering Applications of Fluid Mechanics," Hunsaker & Rightmire (1948), McGraw-Hill, New York, Chapter XII. If the polymer core stream 8 moves to one side of the wedge-shaped region 28, it narrows the wedge on that side of said wedge 28 and widens the wedge on the opposite side of said wedge 28. This results in an increase in pressure on the side of the wedge 28 to which the core polymer stream 8 is the closest, and a decrease in the pressure on the side of the wedge 28 from which the core polymer stream 8 is the furthest. Thus, due to the difference in pressure created by the different size wedges, the pressure tends to force the core polymer back towards the center or back towards the lower pressure region, which is the wider wedge. As the wider wedge narrows, the pressure within it increases and as the wedge which was narrow becomes wider, the pressure within it decreases. Thus, the core polymer is centered within the wedge due to forces which tend to circumferentially equalize the pressure within the wedge-shaped region 28.

This results in a very low polymeric sheath eccentricty ratio (the relationship of the maximum width of the sheath divided by the minimum width of the sheath). It is extremely desirable that the sheath eccentricity ratio be as low as possible, less than 2.0 and preferably less than 1.5, because concentricity of the sheath 6 and the core 8 of the finished product confers better geometry to the product allowing more economical covering of the core and thus a more nearly perfect and uniform product. As the thickness of the sheath to be applied decreases it becomes very important to be able to closely control the eccentricity ratio to insure that the core is completely sheathed. For a given core diameter, sheath thickness is dictated by economy, flexibility and the fact that after draw-down of the fiber (approximately 4×) the sheath must be at least 3 wavelengths of light thick for application of this process to the production of fiber optic filaments. For example, in the case of 10 mil diameter optical fiber the sheath thickness should be a maximum of 4 mils and a minimum of 2 mils as the fiber exits orifice 16. Sheath thickness is specified by the ratio of core volume to sheath volume and the thickness of the filament to be produced. In making 10 mil optical filaments at least a 4 to 1 volumne ratio should be maintained, and preferably at least a 12 to 1 volume ratio. In making thicker filaments at least a 14 to 1 volume ratio should be maintained. Up to 26 to 1 volume ratios have been achieved with thicker filaments (for example, 40 mil fibers after draw-down of approximately 6.5×).

The eccentricity ratio has been discovered to be dependent on the length of the moving surface 32 relative to the diameter of the core material at the orifice 16.

The ratio of the length of the moving surface 32 divided by the core diameter at the orifice 16 should be at least 0.48 and preferably at least 0.9 in any wedge formed in which the fixed surface 24 is convergent toward the orifice 16 as in FIG. 4. The ratio of the lengths of the moving surface 32 divided by the core diameter at the orifice 16 should be at least 0.22 in any wedge (reverse wedge) formed in which the fixed surface 24 is neither convergent or divergent toward orifice 16. Due to the various positions that the injector tip 30 can be in in relationship to the fixed surface 24 it is necessary to define that portion of the moving surface 32 that is used in the moving surface/core diameter ratio. The length of moving surface 32 that is to be used in computing the above ratio is the longest continuous length running upward from the first point of constant sheath thickness at or in orifice 16, that lies below a line drawn perpendicular to the longitudinal axis of injector 12 at or below injector tip 26 and intersects both the fixed and moving surfaces in the period of space in which they are relatively convergent. This length of the moving surface is required so that the circumferentially equalizing forces in the sheath material will have sufficient time to act upon and center the core material. Although the eccentricity ratio has been determined to be independent of the ratio of the viscosities of the sheath and core it appears that the length of the moving surface 32 is inversely related to the apparent sheath viscosity. The position of the tip 26 of the orifice 16 is determined by the length of the moving surface 32 desired, but where the fixed surface 24 is convergent with respect to the orifice 16 it is preferred that the tip be within the wedge defined by the convergent fixed surface 24.

Excellent sheath/core filaments have been produced when the viscosity of the core polymer material was less than, equal to or greater than the viscosity of the sheath polymer material. The general extrusion range of apparent viscosities of thermoplastic polymers for which this process is useful is about $10^2$ to about $10^5$ poise. This process is applicable to any extrudable thermoplastic that doesn't react adversely with the other polymers in the extruder. In fiber optic production the preferred thermoplastic polymers are polystyrene, polymethylmethacrylate, polyfluoroalkylmethacrylate and fluoroalkylmethacrylate/methylmethacrylate copolymer.

The eccentricity ratio has been dicovered to be independent of the wind-up and polymer throughput rates.

EXPERIMENTAL DATA

Examples 1 to 12

A press spinner having a heated block (220° C.) within which plugs of sheath and core polymeric material are melted in separate chambers is equipped with a pair of hydraulically driven pistons of proportionate cross-sections to produce the desired core/sheath volume ratio (4:1 in Examples 1–4 and 6–12, and 12:1 in Example 5). The pistons are driven into the melted sheath and core polymers to extrude them through a spinnerette built to operate as above described. The press spinner pumped sheath and core polymeric material to a spinnerette as shown in FIGS. 3 and 4 with orifice inner diameter, injector inner diameter, injector tip clearance, and sheath passage annular width as denominated in the tabular information. Polymeric material used in the tabulated examples were as follows: sheath polymer, polyfluoroalkyl methacrylate with an inherent viscosity of 0.63 or 0.64 as measured in Freon 113 at 20° C. (.25 gram of sample 150 ml. solvent) in a Cannon-Fenske viscometer No. 50 and a density of 1.68 gr./cm.$^3$; and core polymer, Grade 8 polymethylmethacrylate molding resin (density 1.19 gr./cm.$^3$) as set by the ASTM D 788–63 for Methacrylate Molding and Extrusion Compounds.

The sheath/core filament was recovered and tests, the results of which are tabulated in Table I, run.

Examples 13 to 17

A pair of electrically driven screw extruders were operated simultaneously at different volume rates to produce a 14.6:1 core to sheath volume ratio for Examples 13–17 as the core and sheath polymers were simultaneously pumped through a spinnerette built to operate as above described. The extruders pumped sheath and core polymeric material to a spinnerette as shown in FIGS. 6 and 7 with orifice inner diameter, injector inner diameter, and sheath passage annular width as denominated in the tabular information. Polymeric material used in the tabulated examples were as follows: sheath polymer, polyfluoroalkyl methacrylate with an inherent viscosity of 0.64 or 0.59 measured as in Examples 1–12 and a density of 1.68 gr./cm.$^3$; and core polymer the same as in Examples 1–12.

The sheath/core filament was recovered and tests the results of which are tabulated in Table II, run.

Examples 13, 14 and 15 were run in a spinnerette as shown in FIGS. 6 and 7 with a 22 mil land in orifice 16. In Examples 16 and 17 the 22 mil land was milled off so that no reverse wedge could be formed. Product was poor in relation to Examples 13, 14 and 15.

TABLE I.—RECESSED-TIP TYPE SPINNERETTES

| Run | Orfice ID (mils) | ID (mils) injector | Injector tip clearance (mils) | Sheath passage: Annular width (mils) | Total polymer throughput (gm./min.) | Wind up rate (ft./min.) | Length of moving surface/diam. of core material | Sheath eccentricity ratio |
|---|---|---|---|---|---|---|---|---|
| 1 | 15 | 20 | 5 | 35 | 1.0 | 47 | | 13 |
| 2 | 15 | 20 | 5 | 35 | 1.0 | 46 | | 8 |
| 3 | 40 | 40 | 13 | 25 | 1.8 | 75 | 0.8 | 1.7 |
| 4 | 30 | 40 | 18 | 25 | 2.5 | 107 | 1.9 | 1.3 |
| 5 | 30 | 40 | 18 | 25 | 1.2 | 52 | 1.7 | 1.6 |
| 6 | 30 | 30 | 18 | 25 | 1.6 | 90 | 1.6 | 1.3 |
| 7 | 40 | 52 | 20 | 15 | 3.5 | 160 | 1.3 | 2.0 |
| 8 | 60 | 73 | 18 | 17 | 1.7 | 78 | 0.9 | 1.6 |
| 9 | 60 | 73 | 19 | 30 | 1.2 | 56 | 0.9 | 1.3 |
| 10 | 30 | 40 | 26 | 25 | 1.2 | 56 | 2.6 | 1.2 |
| 11 | 30 | 40 | 45 | 25 | 1.2 | 56 | 3.3 | 1.25 |
| 12 | 60 | 30 | 19 | 50 | 1.2 | 56 | 1.0 | 1.1 |

TABLE II.—REVERSE WEDGE TYPE SPINNERETTE

| Experiment | Orifice ID (mils) | ID (mils) injector | Sheath passage: minimum annular width (mils) | Total polymer throughput (gm./min.) | Wind up rate (f./min.) | Spinnerette temperature,° C. | Length of moving surface/diam. of core material | Sheath eccentricity ratio |
|---|---|---|---|---|---|---|---|---|
| 13 | 101.3 | 91.4 | 5 | 22.5 | 75 | 195 | 0.22 | 1.6 |
| 14 | 101.3 | 91.4 | 5 | 22.5 | 75 | 195 | 0.22 | 1.4 |
| 15 | 101.3 | 91.4 | 5 | 22.5 | 75 | 177 | 0.22 | 1.7 |
| 16 | 101.3 | 91.4 | 5 | 22.5 | 75 | 195 | 0 | 3.4 |
| 17 | 101.3 | 91.4 | 5 | 22.5 | 75 | 195 | 0 | 3.0 |

As many apparently widely differently embodiments of this invention may be made without departing from the spirit and scope thereof, it is to be understood that this invention is not limited to the specific embodiments thereof except as defined in the appended claims.

What is claimed is:
1. In a process for producing a sheath/core filament by co-extruding sheath and core polymer streams from a spinnerette, the improvement being forming a circumferentially pressure equalized reservoir of molten sheath polymer about the outlet of a core polymer passage, extruding a stream of molten core polymer from said outlet of said passage toward an orifice, simultaneously extruding a stream of molten sheath polymer from said reservoir into intimate contact with said core polymer stream whereby enveloping said core in a sheath and forming a moving annular surface which is the interface between the sheath polymer stream and said core polymer stream, providing a fixed annular surface in the path of said sheath polymer stream which is convergent with respect to said moving annular surface as said moving surface approaches said orifice, thereby forming a circumferential pressure equalizing region within said sheath polymer stream which centers said core polymer stream in said sheath polymer stream and obtaining as a result thereof from said orifice a sheath/core filament in which the core is well-centered within the sheath.

2. The process of claim 1 in which said fixed surface is convergent toward said orifice.

3. The process of claim 1 in which said moving surface is divergent toward said orifice.

4. The process of claim 1 in which said fixed surface is convergent toward said orifice and said moving surface is divergent toward said orifice.

5. The process of claim 1 in which said fixed surface and said moving surface are convergent toward said orifice.

6. The process of claim 1 in which said fixed and moving annular surfaces are decreasingly monotonically convergent toward said orifice with respect to each other.

7. The process of claim 2 in which the length of said moving annular surface is equal to at least 0.48 of the diameter of said core polymer stream in said orifice.

8. The process of claim 3 in which the length of said moving annular surface is equal to at least 0.22 of the diameter of said core polymer stream in said orifice.

9. The process of claim 7 in which the sheath/core filament produced has at least a 4:1 core to sheath volume ratio, the maximum thickness of said sheath at said orifice is 4 mils and the eccentricity ratio is no greater than 2.

10. The process of claim 8 in which the sheath/core filament produced has at least a 14:1 core to sheath volume ratio, the maximum thickness of said sheath at said orifice is 4 mils and the eccentricity ratio is no greater than 2.

References Cited

UNITED STATES PATENTS

| | | | |
|---|---|---|---|
| 3,195,865 | 7/1965 | Harder | 259—4 |
| 3,239,197 | 3/1966 | Tollar | 259—4 |
| 3,315,021 | 4/1967 | Luzzatto. | |
| 3,318,987 | 5/1967 | Fitzgerald | 264—171 |
| 3,328,003 | 6/1967 | Chisholm | 259—4 |

FOREIGN PATENTS 1,365,873  5/1964  France.

JULIUS FROME, Primary Examiner

J. H. WOO, Assistant Examiner

U.S. Cl. X.R.

18—8; 264—168

PO-1050
(5/69)

UNITED STATES PATENT OFFICE
CERTIFICATE OF CORRECTION

Patent No. 3,458,615　　　　Dated July 29, 1969

Inventor(s) Chester Griswold BRAGAW and Robert Latham WASHBURN

It is certified that error appears in the above-identified patent and that said Letters Patent are hereby corrected as shown below:

Col. 4, line 27 "(1948)" should be -- (1947) --.

Col. 5, line 15, after "length" insert -- or portion --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents